United States Patent [19]

Schiffner et al.

[11] 4,302,107

[45] Nov. 24, 1981

[54] INTERFEROMETER WITH A COIL COMPOSED OF A SINGLE MODE WAVEGUIDE

[75] Inventors: Gerhard Schiffner, Munich; Dieter Rosenberger, Sauerlach, both of Fed. Rep. of Germany

[73] Assignee: Siemens Aktiengesellschaft, Berlin & Munich, Fed. Rep. of Germany

[21] Appl. No.: 21,692

[22] Filed: Mar. 19, 1979

[30] Foreign Application Priority Data

Apr. 4, 1978 [DE] Fed. Rep. of Germany ....... 2814476

[51] Int. Cl.³ .................................................. G01B 9/02
[52] U.S. Cl. .................................... 356/350; 356/351
[58] Field of Search ............................... 356/350, 351

[56] References Cited

U.S. PATENT DOCUMENTS 4,120,588 10/1978 Chaum ................................ 356/350
4,141,651 2/1979 Smith et al. ......................... 356/350

OTHER PUBLICATIONS

Marcatili, "Dielectric Rectangular Waveguide and Directional Coupler for Integrated Optics", *The Bell System Technical Journal*, vol. 48, Sep. 1969, pp. 2071–2102.
Baues, "Integriert Optische Richtkoppler", *Elektronik-Anzeiger*, vol. 9, No. 3, 1977, pp. 19–22.
Vali et al., "Ring Interferometer 950 m Long", *Applied Optics*, vol. 16, No. 2, pp. 290–291, Feb. 1977.

*Primary Examiner*—John K. Corbin
*Assistant Examiner*—Matthew W. Koren
*Attorney, Agent, or Firm*—Hill, Van Santen, Steadman, Chiara & Simpson

[57] ABSTRACT

An interferometer with a single mode optical waveguide wound in a coil, which waveguide has an end surface at each end for the acceptance of light into the waveguide and for the emitting of light that is in the waveguide, a beam dividing element for superimposing a portion of light from each of the end surfaces of the waveguide into two separate superimposed beams of light characterized by a polarizer arranged in the path of each of the superimposed beams of light for filtering the light as it is received by a beam receiver, which may be a screen or a light sensitive element such as a photo diode. The beam splitting element may be a beam splitting element having a reflective surface such as a partially reflective mirror or a beam splitting cube or may be optical directional couplers.

9 Claims, 4 Drawing Figures

INTERFEROMETER WITH A COIL COMPOSED OF A SINGLE MODE WAVEGUIDE

BACKGROUND OF THE INVENTION

The present invention is directed to an interferometer with a single mode optical waveguide wound in a coil which waveguide has an end surface at each end for accepting light into the waveguide and for emitting light traveling in the waveguide.

An interferometer with an optical single mode waveguide which is wound to form a coil and which has end surfaces at each end of the coil for accepting light and for emitting the light with a polarizing filter arranged in the path of the light being emitted from the end surfaces is disclosed in the copending United States patent application Ser. No. 2,615 filed Jan. 11, 1979 which issued as U.S. Pat. No. 4,259,016 on Mar. 31, 1981. Reference is made to this copending application and its disclosure is incorporated herein by reference thereto. As pointed out in this copending application, an improved device is obtained by positioning the polarizer to polarize the light as it is being emitted from the end surfaces of the waveguide.

SUMMARY OF THE INVENTION

The present invention is directed to an improvement in the interferometer such as disclosed in the above mentioned United States application. This improvement provides greater accessibility to the polarizers and allows them to be jointly integrated with receiving elements and, therefore, the improvement enables lowering the cost of manufacturing of the device.

To accomplish these improvements, the present invention utilized an interferometer with an optical single mode waveguide wound in the coil, said waveguide having an end surface at each end for accepting light into the waveguide and for emitting light which is traveling in the waveguide, means for superimposing a portion of the light emitted from each end surface of the waveguide to form two separate superimposed beams of light and means for receiving each of said superimposed beams. The improvement comprises providing polarization filters arranged between the means receiving the superimposed beams of light and the means for forming the superimposed beams of light so that each of the superimposed beams passes through a polarizing filter prior to reaching the means for receiving the beam.

The means for superimposing the beams of light may utilize a beam dividing element having a reflective surface such as a partial mirrored surface of a beam splitting cube. The means for superimposing may also utilize directional couplers.

DESCRIPTION OF THE PREFERRED EMBODIMENTS

Figure 1:
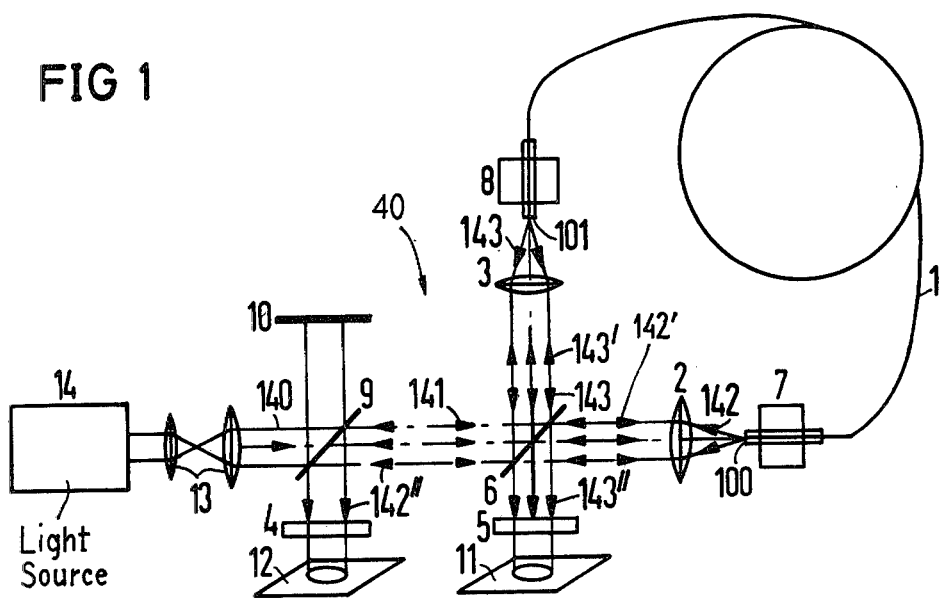
FIG. 1 is a schematic presentation of an embodiment of an interferometer in accordance with the present invention.

The principles of the present invention are particularly useful in an interferometer generally indicated at 40 in FIG. 1.

The interferometer 40 includes a light source 14, which preferably generates a coherent linear polarized light and is preferably a laser. The light from the source 14 is received by a lens system 13, which, as illustrated, consists of two collector lenses, and the lens system 13 changes the output of the source 14 to a light beam 140 with a suitable diameter. The light beam 140 is directed at a beam dividing element or divider 9 whereby a part of the light is coupled out and applied to a light absorber 10. A portion 141 of the light beam passes through the divider 9 and arrives at a beam divider or dividing element 6 and is divided up into two partial beams or sub-beams 142' and 143' of about equal power.

The partial beam 142' is focused by a lens 2 onto an end surface 100 of a single mode optical waveguide fiber 1, which is wound into a coil of a prescribed number N of windings of a prescribed radius R. The other partial beams 143' is focused by a lens 3 into the other end surface 101 of the fiber 1. Each of the end surface 100 and 101 are held in an adjustable mounting device 7 and 8, respectively. Each of the end surfaces 100 and 101 are light acceptance surfaces and also act as display surfaces for displaying or emitting light traveling in the fiber 1.

The lenses 2 and 3 expediently have the same focal length and micro-objectives are preferably used. The lens 13 together with the lenses 2 and 3 form an imaging optic of means by which the light source is image purely real on the light acceptance surfaces 100 and 101 of the light waveguide.

The coupled in light beam travels in the coiled single mode waveguide fiber 1 in opposite directions and re-emerges through the light display surfaces at each end surface 100 and 101 of the waveguide as beams 142 and 143. The beam path of the emerging light is fixed and the beam again arrives via the lenses 2 and 3 at the beam dividing element 6 where each of the beams 142 and 143 is divided into two separate points or portions which are brought into superimposition. A part or portion of each of the beams 142 and 143 proceeds to a screen 11 while the other part or portion proceeds in the direction of the source and a part of this is split and projected onto a screen 12 by the beam divider 9. In FIG. 1, beam divider or partially reflective mirrors are used as the beam dividing elements 6 and 9 and are arranged at an angle of 45° to the axis of beams 140, 141, 142, 142' and 143. However, beam splitting cubes could also be utilized. The waveguide 1 is a single mode waveguide and preferably consists of a glass fiber.

As illustrated, each of the groups of beams 142 and 143, which emerge from the end surfaces 100 and 101, respectively, strike the reflective surface of the beam divider element 6 at an angle of approximately 45°. Due to the partial reflective nature of the element 6, a portion of the beam 142 is reflected in the direction of the beam 143'' and a second portion is transmitted through the element 6 in the direction of beam 142'' toward the element 9. In a similar manner, the beam 143 strikes the opposite side of the partially reflective surface of the divider 6 and has a portion reflected toward the element 9 to be superimposed with the portion of the beam 142 which passes through the element 6. The beam 143 also has a portion that passes through the divider 6 and is superimposed with the portion of the beam 142 which was reflected to form the superimposed beam 143". The reflected portion of the beam 143 and the transmitted portion of the beam 142 are superimposed and form a superimposed beam 142" which is directed at the beam dividing element 9. A portion of this will be reflected by the element 9 onto the screen 12.

In the above mentioned patent application, it was pointed out that a single mode optical fiber forming the waveguide 1 could cause variations in the direction of polarization of the light being transmitted therein and the patent application proposed providing polarization filters either adjacent the end surfaces 100, 101 or the lenses 2 and 3 to filter out erroneous polarization directions and to have the desired polarization direction in the light being emitted from the coiled waveguide 1. In the present application, a polarization filter 5 is located between the beam dividing element 6 and the screen 11 and another polarization filter 4 is located between the beam dividing element 9 and the screen 12.

Each of the polarization filters 4 and 5 should be selected to be of the same type and oriented in accordance with the polarization direction of the light which is to be input coupled into the waveguide 1. Thus, in the case of linearly polarized light which is to be input coupled into the waveguide 1, linear polarization filters should be used and aligned parallel to the polarization direction of the light which is to be input coupled. However, this is merely a special circumstance. Generally speaking, it is also possible to use eliptical polarized light or circular polarized light.

In the embodiment illustrated, the filter 4 is arranged between the beam dividing element 9 and the screen 12. If the polarizer 4 were relocated to be between the beam dividing elements 6 and 9, then the element 4 would also act as a polarizer for the light being input coupled into the waveguide 1 and the necessity of utilizing a light source which produces polarized light would be eliminated.

Figure 2:
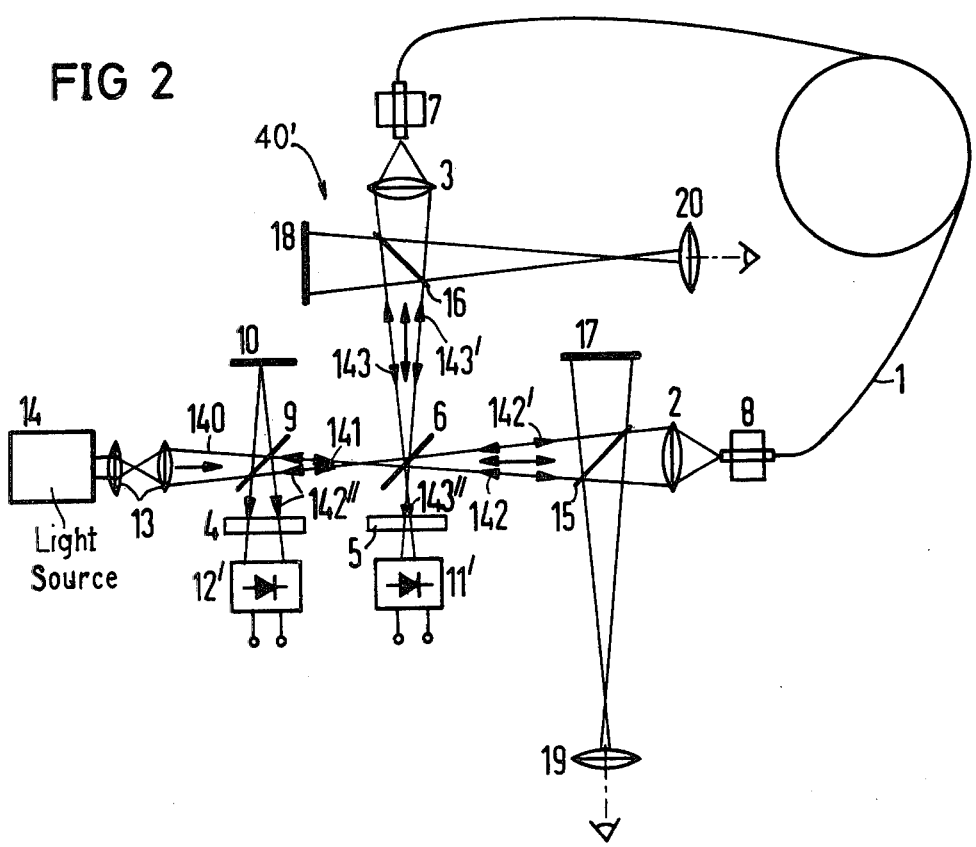
FIG. 2 is a schematic presentation of a second embodiment of an interferometer in accordance with the present invention.

In FIG. 2, an embodiment of the interferometer is generally indicated at 40' and is a complete embodiment of the interferometer as is used for experiments. It is distinguished from the embodiment of the interferometer 40 of FIG. 1 essentially by means of the optical installation which includes means for providing a magnified observation of the surface for coupling in and coupling out light. This optical means or optical installation includes optical elements 15, 17 and 19 or 16, 18 and 20, respectively, for the magnified observation for the end surfaces of the fiber. The beam dividing elements 15 and 16, which are arranged in the partial beams 142 and 143, respectively, will couple out a small part of the light of the partial beams 142 and 143, respectively. This small part of the partial beam 142 and 143 with the help of lenses 2 and 3, respectively, provides enlarged purely real images of the light acceptance and light display surfaces at the end surfaces 100 and 101 of the fiber 1, respectively. These generated enlarged images can be viewed with the aid of the oculars 19 and 20, respectively. The elements 17 and 18 are arranged on the other side of the beam dividing elements or dividers 15 and 16 and are light absorbers with the light absorber 17 being associated with the ocular 19 and the beam divider 15 and the absorber 18 being associated with the beam divider 16 and the ocular 20.

In the embodiment of 40', the screens 11 and 12 have been replaced by light sensitive elements such as photo diodes 11' and 12'. Here the interval of the lenses 2 or 3, respectively, from the light acceptance and light display surfaces of the fiber ends 100 and 101, respectively, is selected in such a manner that no circular fringe pattern occurs and this adjustment of the interval renders the use of photo diodes possible. The photo diodes, moreover, can also be used in the arrangement according to FIG. 1 in place of the screens 11 and 12.

In the interferometer 40 of FIG. 1, the parallel beams are used whereas in the interferometer 40' of FIG. 2 converging or diverging beams, respectively, are used. Thereby, it is assured that with a sharp imagining of the light acceptance and light display surfaces at the end surfaces 100 and 101, respectively, the focal point of the light beam of the light to be coupled into the fiber in both optical devices, which light is usually a laser beam, lie on the end surfaces 100 and 101. The embodiment of the interferometer 40' of FIG. 2 allows a simple and easy adjustment of the position of the light acceptance and light display surfaces at the ends of the waveguides.

Figure 3:
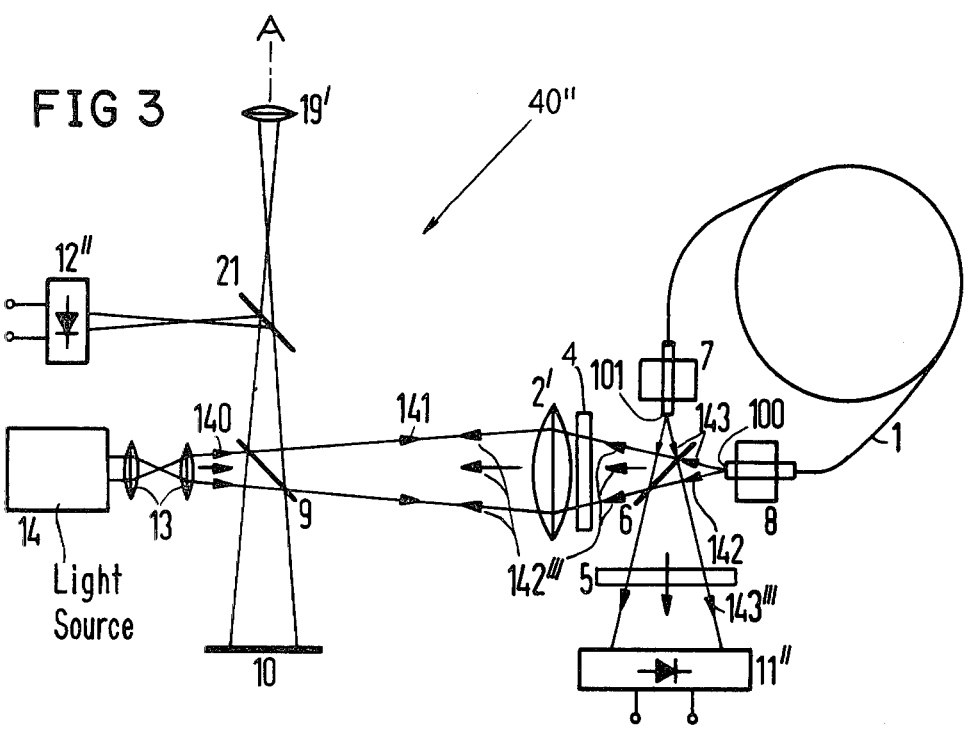
FIG. 3 is a third embodiment of an interferometer in accordance with the present invention.

Another embodiment of the interferometer is illustrated in FIG. 3 and generally indicated at 40". The interferometer 40" utilizes only one lens 2' and the lens system 13 as the means for the purely real imaging of the light source. Moreover, it functions with only a single installation including the beam splitter 9, a second beam dividing element or beam splitter 21 and an ocular 19' for the magnified observation of the light acceptance and light display surfaces at the ends of the waveguide 1. The lens 2' in FIG. 3 is for the purely real imaging of the light source on or in the proximity of the light acceptance and light display surfaces at the end surfaces 100 and 101 of the waveguides 1. In essence, therefore, only a single lens is used here for the purely real imaging. This lens is located between the beam dividing element 6 and the light source 14. The polarization filter is still arranged in the beam path 143''' of the superimposed partial beams and is between the dividing element 6 and the photo diode 11". Thus, the filter 5 filters the superimposed beam 143''' which is formed by a reflected portion of beam 142 and a portion of beam 143 which passes through the element 6. The polarization filter 4 is located in the path of the superimposed beam 142''' which is composed of a portion of beam 143 that was reflected by the reflective surface of the element 6 and a portion of beam 142 which was passed or transmitted by the element 6. As illustrated, the polarization filter 4 is arranged between the lens 2' and beam dividing element 6. It could also be located between the beam dividing element 9 and lens 2' or between the beam dividing elements 9 and 21. A photo diode 11" which assumes the position of the screen 11 of the interferometer 40 of FIG. 1 serves for the measurement of the circle of fringe patterns formed by the superimposed beam 143''' which is composed of parts of partial beams 142 and 143. The position of the screen 12 illustrated in the embodiment 40 of FIG. 1 is assumed by a photo diode 12". Between the photo diode 12" and the additional beam dividing element 9, a further additional beam divider 21 is arranged. By means of the lens 2', the light acceptance and light display surfaces at the ends of the waveguide 1 are imaged purely real between the beam divider element 21 and the ocular 19'. By means of the ocular 19', this purely real image is magnified to be viewed by an eye. The beam divider elements are preferably expediently selected as beam divider mirrors or beam splitting cubes in such a manner that radiation with the wavelength of the light source 14, which is generally a laser, reflects well. The beam divider element 21 should be highly transmissive for other spectral ranges. Both light acceptance and light display surfaces can be magnified via the ocular 19' whereby the ends of the fiber are expediently illuminated with white light. The essential beam dividing element is expediently executed as a 50% beam dividing element. The same is also true for the additional beam divider element 9. Again, similar to FIG. 2, converging and diverging light beams, respectively, are used to light beams. The installation or the embodiment 40" according to FIG. 3 is similar to the embodiment 40' of FIG. 2. However, the adjustment of the portion of the ends of the waveguide is somewhat more difficult since both waveguide ends are simultaneously visible in the microscope and are imaged on top of one another.

By means of the use of a suitable technology for the signal evaluation, even very small angular velocities can be determined in the embodiments 40, 40' and 40" of FIGS. 1, 2 and 3. Hereby the fiber coil is advantageously sinusoidally turned back and forth or oscillated with an angular velocity of $\omega_w$. The signal of the photo detectors 11' and 11", respectively, and 12' and 12", respectively, are electrically divided. For example, the ratio of the output voltage of the photo detector 11' or 11", respectively, and 12' and 12", respectively, is formed. This will cancel or drop out the intensity fluctuations of the light source 14. This signal of the photo diode is multiplied by a sinusoidal signal with the oscillation frequency $\omega_w$ and the corresponding phase attitude and this combined signal is subsequently integrated over a number of periods of oscillation frequency. One can demonstrate that the voltage thus accordingly is approximately proportional to the angular velocity of the entire construction relative to the inertial system. Angular velocities in a magnitude of 0.01% per hour can be determined wherein the shot noise of the photo diode functions as the only limitation.

At least the beam dividing element 6 and an additional beam dividing element 9 illustrated in FIGS. 1-3 can be replaced by optical directional couplers, for example, 3dB-couplers. This leads to a significant simplification of the design of the device. The optical directional couplers have already been suggested in the technology of integrated optics and have been described a number of times in literature, for example see an article by E. A. J. Marcatili, "Dielectric Recgangular Waveguide and Directional Coupler for Integrated Optics", *The Bell System Technical Journal,* September 1969, Vol. 48, pp. 2071-2102, and P. Baues, "Integriert Optische Richtkoppler", *Electronik-Anzeiger,* 9, 1977, pp. 19-22. Here, above all, it is a question of directional couplers, which are constructed with coupled single mode waveguides as coupling waveguides. However, basically, all optical directional couplers, which are built up with at least two coupling waveguides or function in the same manner, are usable. Basically, an optical directional coupler is to be understood as a quadripole or four-part element particularly a non-reciprocal quadripole or four-part element. Such a quadripole or four-part element exhibits four ends, which can act both as inputs and outputs. In other words, it has four surfaces for coupling or decoupling light from the fiber. As already mentioned, a simple embodiment of such an optical directional coupler exhibits two coupling waveguides whose ends exhibit light acceptance and light display surfaces and form the input and outputs, respectively, of the directional coupler. Let it be pointed out here that there are most certainly optical directional couplers with only three inputs or outputs, respectively, the fourth input or output, respectively, is then an input and output respectively which is not externally accessible.

Figure 4:
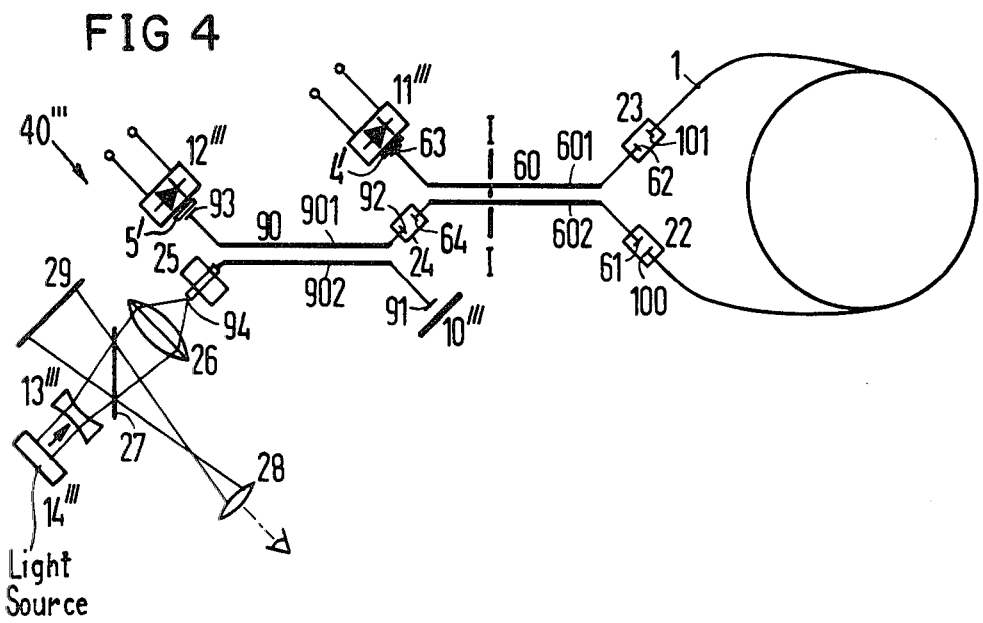
FIG. 4 is a fourth embodiment of an interferometer in accordance with the present invention.

In FIG. 4, the interferometer is generally indicated at 40''' and an optical directional coupler 60 is used in place of the beam dividing element 6 in the device of FIGS. 1-3, which element 6 was either a beam divider mirror or a beam splitting cube. The coupler 60 has two waveguides 601 and 602 whose ends 61–64 form four input-output ends. The input-output ends 61, 62, respectively, are individually coupled onto the light acceptance and light display surfaces of the ends 100 or 101, respectively, of the waveguide 1. The coupling is accomplished by so-called coupling plugs 22 and 23, respectively. The input-output end 63 of the coupler 60 is coupled into a photo diode 11''' which assumes the place of the screen 11 in the embodiment of FIG. 1. The fourth input-output end 64 of the coupler 60 is coupled to an input-output end 92 of an additional optical direction coupler 90 bia a plug connection 24.

The additional coupler 90 has four input-output ends 91, 92, 93 and 94 which are formed by the waveguide elements 901 and 902. An input-output end 94 of the directional coupler 90 is held by a fiber holding adjusting installation 25 and light from the source 14''' is coupled into the system of couplers 90 and 60 at this end. A coupling installation consists of a collector lens 26 and a diverging lens 13''' and means for forming a purely real imaging of the light source 14''' is imaged on the input-output end 94 of the directional coupler 90. A beam dividing element such as a divider mirror 27 is located between the divergent lens 13''' and the collector lens 26 in the beam path of the light. The beam dividing element 27 has a light absorber 29 located on one side and an ocular 28 on the opposite side in the manner similar to the embodiments illustrated in FIGS. 1-3. The beam dividing mirror or element 27, the lens 26 and the ocular 28 together form an optical installation for the magnified observation of the light acceptance and the light display surfaces of the waveguides. In the present case, the optical installation forms a magnified observation of the surface of end 94 of the optical directional coupler 90.

Input-output end 93 of the optical directional coupler 90 is coupled to a photo diode 12'''. A light absorber 10''' lies opposite the input-output end 91 of the direction coupler 90. Polarization filter 4' is located between the end 63 and the photo diode 11''' and a polarization filter 5' is located between the photo diode 12''' and end 93. The polarization filters 4' and 5' can be formed directly on their respective photo diodes which are the receiving elements and this advantage is available when photo diodes are used for the light receiving elements.

With the use of semiconductor diode lasers as the light source, it is possible to significantly simplify the coupling installation. In addition, a single mode plug is preferably used for each of the plugs 22, 23 and 24.

In each of the embodiments, it is expedient to orient the polarization filters in such a manner that in an ideal light conducting fiber, which does not influence the polarization, the filters only minimally weaken the intensity of the light.

Although various minor modifications may be suggested by those versed in the art, it should be understood that we wish to embody within the scope of the patent granted hereon, all such modifications as reasonably and properly come within the scope of our contribution to the art.

We claim:

1. In an interferometer with an optical single mode waveguide wound into a coil, said waveguide having an end surface at each end for accepting light into the waveguide and for emitting light which is traveling in the waveguide, means for superimposing a portion of the light emitted from each end surface of the waveguide to form two separated superimposed beams of light, and means for receiving each of said superimposed beams of light, the improvement comprising a polarization filter being arranged between each of the means for receiving each of the superimposed beams of light and the means for forming the superimposed beams, said polarization filters being the same type and having the same orientation so that each of the superimposed beams passes through a polarization filter prior to reaching the means for receiving the beam.

2. In an interferometer according to claim 1, wherein the means for superimposing a portion of light emitting from each end surface includes a beam dividing element having a reflective surface extending at an angle of 45° to the axis of the light being emitted from each of the end surfaces of the waveguide, said reflective surface being partially reflective to split the light into a reflected portion and a transmitted portion so that one superimposed beam of light is formed by a transmitted portion of the light from one end surface and a reflected portion from the other end surface and the other beam of superimposed light is formed by a transmitted portion from the other end surface and the reflected portion of light from the one end surface.

3. In an interferometer according to claim 2, wherein the beam dividing element is a partially reflecting mirror.

4. In an interferometer according to claim 2, wherein the beam dividing element is a beam splitting cube.

5. In an interferometer according to claim 2, which further includes a second beam dividing element having a reflective surface arranged in the path of superimposed beam of light from the first mentioned beam dividing element.

6. In an interferometer according to claim 5, wherein each beam dividing element is a partially reflective mirror.

7. In an interferometer according to claim 5, wherein each beam dividing element is a beam splitting cube.

8. In an interferometer according to claim 1, wherein the means for superimposing includes optical directional couplers with each coupler having four coupling points, two of said coupling points of a coupler being coupled to the end surfaces of the waveguide and the other two coupling points being coupled to photosensitive elements forming the means for receiving the light through the polarization filters.

9. In an interferometer according to claim 8, wherein a second optical directional coupler having four coupling points is interposed between a second photosensitive element and one of the other two coupling points of the first mentioned coupler, said second coupler having a coupling point connected through a polarizer to said second photosensitive element.

* * * * *